United States Patent
Miyagawa et al.

(10) Patent No.: US 7,946,112 B2
(45) Date of Patent: May 24, 2011

(54) EXHAUST HEAT RECOVERY DEVICE

(75) Inventors: Masashi Miyagawa, Ichinomiya (JP); Yasutoshi Yamanaka, Kariya (JP); Koichi Ban, Tokai (JP); Kimio Kohara, Nagoya (JP)

(73) Assignee: Denso Corporation, Kariya (JP)

( * ) Notice: Subject to any disclaimer, the term of this patent is extended or adjusted under 35 U.S.C. 154(b) by 13 days.

(21) Appl. No.: 11/992,507

(22) PCT Filed: Jun. 7, 2007

(86) PCT No.: PCT/JP2007/061533
§ 371 (c)(1),
(2), (4) Date: Mar. 24, 2008

(87) PCT Pub. No.: WO2007/142292
PCT Pub. Date: Dec. 13, 2007

(65) Prior Publication Data
US 2009/0293461 A1    Dec. 3, 2009

(30) Foreign Application Priority Data

Jun. 8, 2006 (JP) ................... 2006-160200
Oct. 18, 2006 (JP) ................... 2006-283598
Jun. 1, 2007 (JP) ................... 2007-147317

(51) Int. Cl.
*F01N 3/02* (2006.01)
*F01N 5/02* (2006.01)
*F28F 27/00* (2006.01)

(52) U.S. Cl. .......... 60/320; 60/321; 165/272; 165/274

(58) Field of Classification Search ................ 60/320, 60/321, 298, 614–624; 123/41.2–41.27; 165/42, 104.21, 272, 274, 276; 237/5, 12.4
See application file for complete search history.

(56) References Cited

U.S. PATENT DOCUMENTS

| 2,083,611 A | * | 6/1937 | Marshall ................ 165/286 |
| 2,921,432 A | * | 1/1960 | Marcotte et al. .......... 55/307 |
| 3,196,976 A | | 7/1965 | Powers et al. |

(Continued)

FOREIGN PATENT DOCUMENTS

JP    56-121980 U    9/1981

(Continued)

OTHER PUBLICATIONS

International Search Report with Written Opinion (and its English translation) for PCT/JP2007/061533, ISA/JP, mailed Aug. 14, 2007.

(Continued)

*Primary Examiner* — Thomas E Denion
*Assistant Examiner* — Christopher Jetton
(74) *Attorney, Agent, or Firm* — Harness, Dickey & Pierce, PLC

(57) ABSTRACT

An exhaust heat recovery device includes an accommodating portion extending continuously without shrinking a section therein and adapted to allow exhaust gas of an internal combustion engine to pass therethrough, a catalyst disposed in the accommodating portion for cleaning the exhaust gas, an evaporator disposed adjacent to the catalyst on a downstream side of an exhaust gas flow in the accommodating portion, and a condenser for condensing the working medium by radiating heat of the working medium flowing thereinto from the evaporator so as to recover exhaust heat on the coolant side. The condenser is located to return the condensed working medium to the evaporator.

3 Claims, 6 Drawing Sheets

U.S. PATENT DOCUMENTS

| | | | | |
|---|---|---|---|---|
| 3,882,050 | A | * 5/1975 | Niebylski | 502/326 |
| 4,426,844 | A | * 1/1984 | Nakano | 60/295 |
| 4,745,965 | A | * 5/1988 | Katsura et al. | 165/104.14 |
| 4,974,667 | A | * 12/1990 | Sun et al. | 165/41 |
| 6,347,511 | B1 | * 2/2002 | Haines | 60/274 |
| 6,564,545 | B1 | * 5/2003 | Dong | 60/289 |
| 6,804,949 | B2 | * 10/2004 | Andrews et al. | 60/272 |
| 7,055,315 | B2 | 6/2006 | Shinohara et al. | |

FOREIGN PATENT DOCUMENTS

| | | |
|---|---|---|
| JP | 59-156110 | * 10/1984 |
| JP | 59-156110 U | 10/1984 |
| JP | 62-037689 | 2/1987 |
| JP | 62-157608 U | 10/1987 |
| JP | 62-268722 A | 11/1987 |
| JP | 04-045393 A | 2/1992 |
| JP | 5-79791 A | 3/1993 |
| JP | 07-120178 A | 5/1995 |
| JP | 2001-207910 A | 8/2001 |
| JP | 2002-266701 A | 9/2002 |
| JP | 2003-148882 | 5/2003 |
| JP | 2003-193831 A | 7/2003 |
| JP | 2003-279060 A | 10/2003 |

OTHER PUBLICATIONS

Office action dated Mar. 12, 2010 in corresponding Chinese Application No. 2007 80001202.6.

Office Action received in the corresponding DE application No. 112007000046.5 dated Aug. 18, 2010. 15750857.1.

* cited by examiner (a)

(b)

EXHAUST HEAT RECOVERY DEVICE

CROSS-REFERENCE TO RELATED APPLICATIONS

This application is a 371 National Stage of International application No. PCT/JP2007/061533, filed Jun. 7, 2007. This application claims the benefit of JP2006-160200, filed Jun. 8, 2006, JP2006-283598, filed Oct. 18, 2006 and JP2007-147317, filed Jun. 1, 2007. The disclosures of the above applications are incorporated herein by reference.

TECHNICAL FIELD

The present invention relates to an exhaust heat recovery device using a heat pipe, and more specifically, an exhaust heat recovery device suitable for use in a vehicle provided with an internal combustion engine.

BACKGROUND ART

A heat-siphon type exhaust heat recovery device has been known as disclosed in, for example, JP-A-7-120178. The exhaust heat recovery device is constructed of a heat siphon including an evaporator and a condenser which are connected in a round shape. The evaporator is disposed in an exhaust pipe of an engine, while the condenser is disposed in an engine coolant pipe, so as to recover the heat of exhaust gas of the engine into the engine coolant.

Generally, a catalyst (catalytic converter) is provided for cleaning the exhaust gas at a midway point in the exhaust pipe. However, JP-A-7-120178 fails to disclose an effective arrangement of the evaporator or a suitable shape or the like of the exhaust pipe, taking into consideration such the catalyst.

For example, the catalyst functions only when the temperature of exhaust gas is equal to or higher than a predetermined temperature. When the evaporator is disposed on the upstream side of the exhaust gas flow from the catalyst, the exhaust gas is cooled by the evaporator, and thus the catalyst cannot sufficiently perform its function.

Since the evaporator is disposed in the exhaust pipe, the exhaust pipe has its size enlarged at an inlet and shrunk at an outlet with respect to the evaporator, thereby causing a loss in pressure of the exhaust gas through circulation. Further, an exhaust heat recovery device is desired which can effectively mount the catalyst and the evaporator on the vehicle or the like.

A loop heat-pipe type heat exchanger is proposed as a heat exchanger using the principle of the heat pipe, as disclosed in, for example, JP-A-4-45393. The heat exchanger includes a sealed circulation path for forming a closed loop, and a heat-transfer fluid sealed into the circulation path and being capable of being evaporated and condensed. The heat exchanger also includes an evaporator disposed in the circulation path for evaporating a working fluid using heat taken thereinto from the outside, and a condenser disposed in a higher position than that of the evaporator in the circulation path for exchanging heat between the heat-transfer fluid evaporated by the evaporator and a fluid to receive the heat transferred from the outside.

In order to provide an exhaust heat recovery device with a simple and compact structure having an advantage in mounting property on the vehicle, it is desirable that the evaporator and the condenser are integrally constructed. Taking one example, as shown in FIG. 8, an evaporator J1 and a condenser J2 are disposed adjacent to each other in the horizontal direction, and headers (connection portions) J5 are provided for communicating between both respective ends of the evaporator J1 and the condenser J2 in the vertical direction of heat pipes J3.

In the above-described exhaust heat recovery device, a working fluid evaporated by the evaporator J1 flows into the condenser J2 through the upper side header J5. The working fluid is condensed at the condenser J2 to become liquid, which flows into the evaporator J1 through the lower side header J5. A difference in water height (a difference in height of a water head h) of the working fluid (liquid) is caused between the evaporator J1 and the condenser J2 by a balance between the evaporation of the working fluid at the above evaporator J1 and the condensation of the working fluid at the condenser J2. This difference in water head height "h" causes the working fluid to be returned from the condenser J2 to the evaporator J1, so as to allow the circulation of the working fluid. Thus, in order to return a sufficient amount of working fluid from the condenser J2 to the evaporator J1, it is necessary to ensure the difference in water head height "h".

The above-described exhaust heat recovery device exchanges heat between the working fluid evaporated by the evaporator J1 and the engine coolant at the upstream side in the condenser J2. Thus, in order to ensure a heat exchanging property of the condenser J2, a heat radiation property of the upper part of the heat pipe J3, positioned at the condenser J2 (that is, on a side into which the working fluid evaporated by the evaporator J1 flows), needs to be assured.

DISCLOSURE OF THE INVENTION

The invention has been accomplished in view of the foregoing problems, and it is an object of the invention to provide an exhaust heat recovery device, which effectively performs a cleaning function of exhaust gas and a recovering function of exhaust heat from the exhaust gas, while having good mounting property.

It is another object of the invention to provide an exhaust heat recovery device which can ensure a difference in water head height between an evaporator and a condenser in circulation of working fluid, while ensuring a heat radiation property of an upper part of a heat pipe disposed in the condenser.

According to a first example of the present invention, an exhaust heat recovery device includes: an accommodating portion formed continuously without shrinking a section of an intermediate part thereof, and adapted to be inserted in a midway portion of an exhaust pipe of an internal combustion engine to allow exhaust gas of the internal combustion engine to pass therethrough; a catalyst, disposed in the accommodating portion, for cleaning the exhaust gas; an evaporator, disposed adjacent to the catalyst on a downstream side of an exhaust gas flow in the accommodating portion, for evaporating a working medium therein by using heat of the exhaust gas; and a condenser, for condensing the working medium by radiating heat of the working medium flowing thereinto from the evaporator toward a coolant side of the internal combustion engine so as to recover heat on the coolant side, and for returning the condensed working medium to the evaporator.

Accordingly, it is possible to provide a compact exhaust heat recovery device including both the catalyst and the evaporator in the accommodating portion, thereby the exhaust heat recovery device can be effectively mounted collectively.

The catalyst is disposed on the upstream side of the exhaust gas flow with respect to the evaporator, and thus can exhibit a sufficient cleaning function of the exhaust gas without being affected by cooling of the exhaust gas at the evaporator. The evaporator exchanges heat with the exhaust gas having been cleaned by the catalyst and having an increased temperature, thereby enabling the effective recovery of the exhaust heat.

The accommodating portion for accommodating the catalyst and the evaporator may be continuously formed without being decreased in size of the section. Thus, the number of enlarged pipe portions or reduced pipe portions formed in the exhaust pipe can be decreased, thereby reducing a loss in pressure of the exhaust gas through the circulation.

For example, a groove extending toward a rear end side of the exhaust pipe may be formed on a lower surface of the accommodating portion. Thus, even when the exhaust gas has its temperature decreased in the evaporator and the moisture in the exhaust gas becomes condensed water, the condensed water is collected in the groove, and further can flow toward the rear end side of the exhaust pipe together with the exhaust gas flow. This can reduce the influences of wetting on the catalyst and evaporator. Furthermore, a plurality of such grooves may be provided. In this case, the condensed water can be collected more effectively to flow toward the rear end side.

Alternatively, the groove may be inclined downward toward the rear end side of the exhaust pipe. Alternatively, the lower surface of the accommodating portion may be inclined downward toward the groove in the width direction thereof.

Alternatively, the lower surface of the accommodating portion may be provided such that the upstream side of the exhaust gas flow from the evaporator is located at a higher position than the downstream side of the exhaust gas flow including the evaporator. In this case, even when the exhaust gas has its temperature decreased in the evaporator and the moisture in the exhaust gas becomes condensed water, the condensed water can be avoided from flowing toward the catalyst, and can also flow toward the rear end side of the exhaust pipe together with the exhaust gas flow. This can further reduce the influences of wetting on the catalyst and evaporator.

Alternatively, a noble metal catalyst may be added to a heat exchanging member included in a heat exchanging portion of the evaporator. Thus, the heat exchanging portion of the evaporator can have the cleaning function of the exhaust gas. This can make the inherent catalyst converter compact.

According to a second example of the present invention, an exhaust heat recovery device to be mounted on a vehicle using an internal combustion engine as a driving source for vehicle running, includes: an evaporator disposed in an exhaust gas path through which exhaust gas discharged from the internal combustion engine is circulated, the evaporator being adapted to exchange heat between the exhaust gas and a working fluid charged thereinto and capable of being evaporated and condensed, thereby evaporating the working fluid; and a condenser disposed in a coolant path through which a coolant of the internal combustion engine is circulated, the condenser being adapted to exchange heat between the coolant and the working fluid evaporated by the evaporator, thereby condensing the working fluid. In the exhaust heat recovery device, the evaporator and the condenser are disposed in a closed loop flow path through which the working fluid is circulated, the evaporator and the condenser are disposed adjacent to each other in a substantially horizontal direction, the condenser has a plurality of heat pipes on a condensation side disposed in parallel to each other, the heat pipe on the condensation side has a small sectional area portion that has a smaller sectional area than that of an upper end portion thereof, and the small sectional area portion is positioned below an upper surface of the working fluid in the heat pipe on the condensation side when the evaporator is heated.

When the circulation of the working fluid is started by heating the evaporator from a state in which the circulation of the working fluid is stopped (in which the evaporator is not heated), the upper surface position (water surface position) of the working fluid on the condensation side is enhanced. At this time, on the condensation side, the small sectional area portion, which has the smaller sectional area (which is a sectional area perpendicular to the longitudinal direction of the heat pipe on the condensation) than that of the upper end portion, is positioned below the upper surface (water surface) of the working fluid when the evaporator is heated. This can further enhance the upper surface position (water surface position) of the working fluid on the condensation side in the circulation of the working fluid, thereby increasing a difference in water head height between the evaporator and the condenser.

In the heat pipe on the condensation side, the small sectional area portion is disposed below the upper surface (water surface) of the working fluid when the evaporator is heated. Thus, the sectional area of a part of the condensation side heat pipe positioned above the upper surface (water surface) of the working fluid when the evaporator is heated does not need to be decreased. Accordingly, it is possible to enlarge the area of the outer surface of the upper part of the heat pipe on the condensation side, thereby improving the heat radiation property.

Thus, it is possible to ensure the difference in water head height between the evaporator and the condenser in circulation of the working fluid, while ensuring the heat radiation property of the upper part of the heat pipe on the condensation side.

A valve mechanism may be provided at a downstream side in the condenser, for opening and closing the flow path through which the working fluid condensed flows into the evaporator. In this case, when the valve mechanism is closed and the return of the working fluid is stopped, the working fluid is stored in the condenser. Therefore, a capacity for storing the condensed working fluid is needed in the condenser on the upstream side of the valve mechanism. Thus, in the heat pipe on the condensation side, positioning the small sectional area portion below the upper surface (water surface) of the working fluid when the evaporator is heated can increase the flow path sectional area of a part of the condensation side heat pipe above the upper surface (water surface) of the working fluid when the evaporator is heated. Therefore, it is possible to ensure the capacity for storing the condensed working fluid on the upper side of the heat pipe on the condensation side.

The small sectional area portion may be disposed at least below the upper surface of the working fluid in the heat pipe on the condensation side when the evaporator is not heated.

BRIEF DESCRIPTION OF DRAWINGS

FIG. 6(a) and FIG. 6(b) are enlarged perspective views showing a part of a heat pipe on the condensation side, in which FIG. 6(a) shows a structure thereof according to a fifth embodiment, and FIG. 6(b) shows a structure of a comparative example;

PREFERRED EMBODIMENTS FOR CARRYING OUT THE INVENTION

First Embodiment

Figure 1:
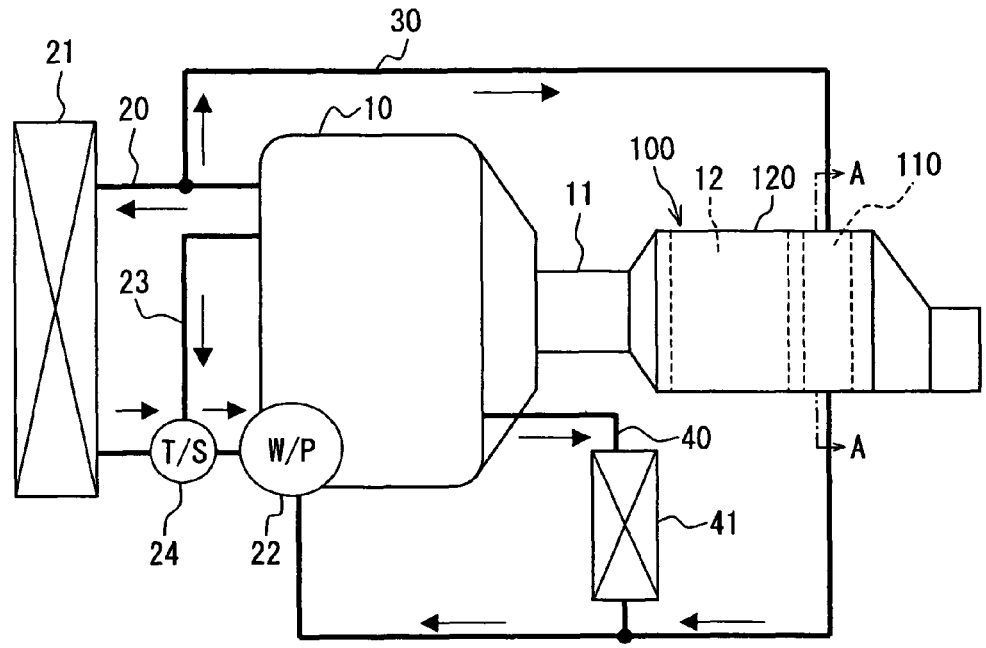
FIG. 1 is a schematic diagram showing a mounted state of an exhaust heat recovery device on a vehicle according to a first embodiment.
Figure 2:
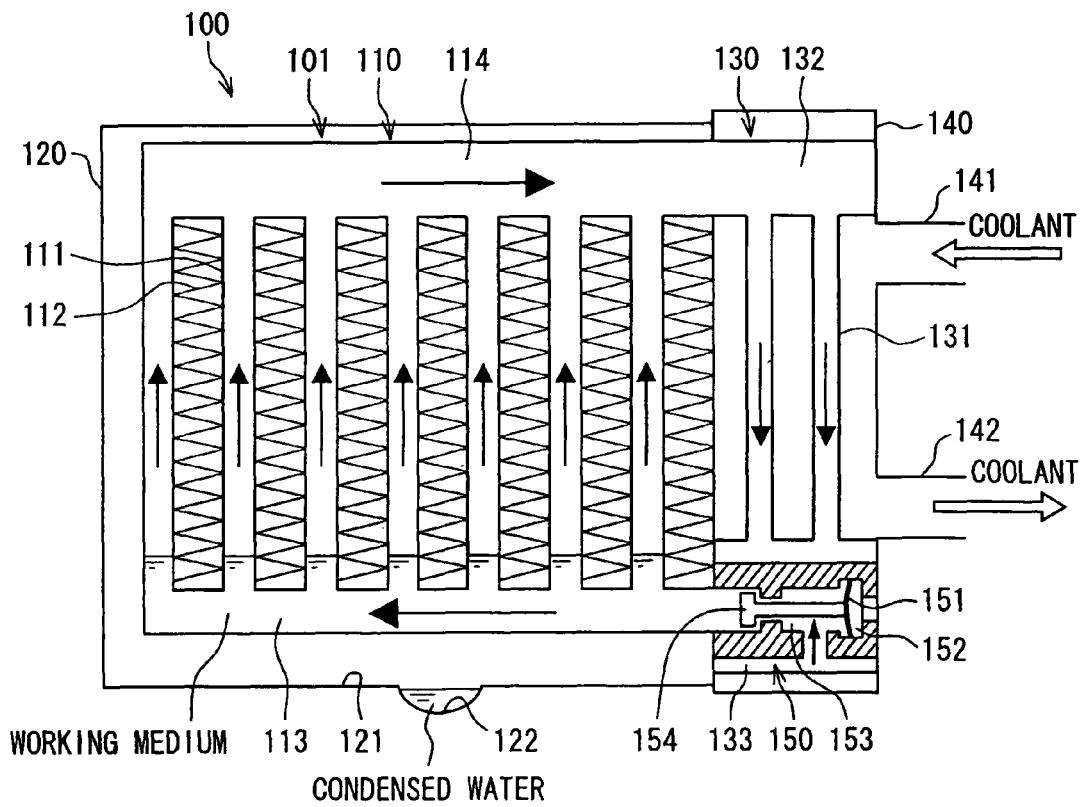
FIG. 2 is a schematic sectional view of the exhaust heat recovery device taken along the line A-A of FIG. 1.

An exhaust heat recovery device 100 according to a first embodiment of the invention is applied to a vehicle using an engine 10 as a driving source for a vehicle running. The exhaust heat recovery device 100 is disposed in an exhaust pipe 11 and an exhaust heat recovery circuit 30 of the engine 10. The specific structure will be described below with reference to FIGS. 1 and 2. FIG. 1 is a schematic diagram showing a mounted state of the exhaust heat recovery device 100 on the vehicle, and FIG. 2 is a sectional view taken along the line A-A of FIG. 1 (exhaust heat recovery device 100).

As shown in FIG. 1, the engine 10 is a water-cooled internal combustion engine, and has the exhaust pipe 11 from which exhaust gas generated after combustion of fuel is discharged. The engine 10 includes a radiator circuit 20 through which the engine coolant (hereinafter referred to as a coolant) for cooling the engine 10 is circulated, the exhaust heat recovery circuit 30 serving as a flow path other than the radiator circuit 20, through which the coolant is circulated, and a heater circuit 40 through which the coolant (warm water) is circulated in a heater core 41 for heating air to be conditioned.

The radiator circuit 20 is provided with a radiator 21, which exchanges heat between the coolant circulated by a water pump 22 and the outside air thereby to cool the coolant. A bypass flow path 23 through which the coolant circulates while bypassing the radiator 21 is provided in the radiator circuit 20. A thermostat 24 is adapted to adjust an amount of coolant flowing through the radiator 21 and an amount of coolant flowing through the bypass flow path 23. In particular, at time of warming the engine, the amount of the coolant on the side of the bypass flow path 23 is increased to promote the engine warming. That is, the coolant is prevented from being super-cooled by the radiator 21.

The exhaust heat recovery circuit 30 is a flow path which branches out from an engine outlet of the radiator circuit 20 to be connected to the water pump 22, and through which the coolant is circulated by the water pump 22. A water tank 140 (condenser 130) of the exhaust heat recovery device 100 to be described later is connected to a midway point of the exhaust heat recovery circuit 30.

The heater circuit 40 is a circuit in which the coolant (warm water) flows from a position different from the engine outlet of the radiator 20, and which merges the downstream side of the exhaust heat recovery circuit 30. The heater circuit 40 is provided with a heater core 41 serving as a heat exchanger for heating. The coolant (warm water) is circulated through the heater circuit 40 by the above-described water pump 22. The heater core 41 is disposed in an air conditioning case of an air conditioning unit (not shown) to heat the air to be conditioned, blown by a blower, through the heat exchange with the warm water.

As shown in FIGS. 1 and 2, the exhaust heat recovery device 100 includes a catalyst 12, an evaporator 110, a duct 120, the condenser 130, the water tank 140, and the like. The catalyst 12 and the evaporator 110 are accommodated in the duct 120, and the evaporator 110 and the condenser 130 are connected to each other. These elements form a loop-type heat pipe 101.

The catalyst 12 is to clean the exhaust gas. The catalyst 12 is formed of a member (monolith) having a rectangular column shape and made of, for example, ceramic material with a catalyst material added thereto.

The heat pipe 101 is provided with a sealing portion not shown. The heat pipe 101 is evacuated to vacuum (decompressed) through the sealing portion, and is encapsulated with the working medium to seal the sealing portion. As the working medium, water is used. Although the boiling point of water is 100 degrees at 1 atm pressure, the air inside the heat pump 101 is decompressed (for example, to 0.01 atm pressure), so that the boiling point becomes 5 to 10° C. It is noted that the working medium for use may include, for example, alcohol, phlorocarbon, freon, and the like, in addition to the water.

Each of members (to be described later) included in the exhaust heat recovery device 100 other than the above-described catalyst 12 is made of a stainless member having high corrosion resistance. After temporarily assembly of these members, the respective members are integrally brazed to each other using brazing material located on an abutment portion and an engagement portion.

The evaporator 110 includes tubes 111, fins 112, a lower tank portion 113, and an upper tank portion 114. The tube 111 has an elongated pipe member having a flat sectional shape. These tubes 111 are arranged in a line with a predetermined tube pitch spaced from each other in the left-right direction shown in FIG. 2 (hereinafter referred to as an arrangement direction) such that the longitudinal direction of the tubes 111 is directed vertically. Furthermore, the tubes 111 are also arranged in plural lines in the direction perpendicular to the paper surface shown in FIG. 2 (hereinafter referred to as a line direction).

The fin 112 serving as a heat exchanging member intervenes between the tubes 111 arranged in the arrangement direction, and is connected to the outer wall face (surface) of the tube 111. The fin 112 is to enlarge the area of heat exchange with the exhaust gas, and is a corrugated fin formed from a thin strip in a wave shape by a roller process. The tubes 111 and the fins 112 form the heat exchanging portion of the evaporator 110.

Each of the lower tank portion 113 and the upper tank portion 114 is formed in a flat case shape. The lower tank portion 113 and the upper tank portion 114 are disposed on two ends of the tubes 111 in the longitudinal direction. Tube holes (not shown) are formed in positions of the tank portions 113 and 114, corresponding to the tubes 111. Each of the tubes 111 has two ends in the longitudinal direction connected into the tube holes of the respective tank portions 113 and 114. The tubes 111 are connected in communication with the tank portions 113 and 114.

The duct 120 corresponds to an accommodating portion in the invention, and allows the exhaust gas to pass therethrough as described later. The duct 120 is a cylindrical member having approximately a rectangular sectional shape, and is formed continuously with the constant sectional area without shrinking the section area of an intermediate part between one end and the other end of the duct 120 in the axial direction. A groove 122 is formed in the lower surface 121 of the duct 120 to extend toward the rear end side of the exhaust pipe 11 when the duct intervenes on the way to the exhaust pipe 11. The section of the groove 122 can have approximately a semicircular shape as shown in FIG. 2, or any other appropriate shape, such as a quadrangular shape, or a V-like shape.

The catalyst 12 and the evaporator 110 are accommodated in the duct 120. The evaporator 110 is disposed on the downstream side of the exhaust gas flow with respect to the catalyst 12 and adjacent to the catalyst 12 in the duct 120. The evaporator 110 is accommodated in the duct 120 such that the line direction of the tubes 111 (the direction perpendicular to the paper surface of FIG. 2) is identical to the flow direction of the exhaust gas (the direction perpendicular to the paper surface of FIG. 2).

The condenser 130 has a plurality of tubes 131 arranged to have a longitudinal direction directed vertically, like the above-described evaporator 110. Both ends of the tubes 131 in the longitudinal direction are formed to be connected to an upper tank portion 132 and a lower tank portion 133. The tubes 131 are located in communication with the insides of the tank portions 132 and 133.

The above-described condenser 130 is accommodated in the water tank 140. The water tank 140 is an elongated case formed to extend along the longitudinal direction of the tubes 131. The water tank 140 has on one end side a coolant introduction pipe 141 for introducing the coolant thereinto, and on the other end side a coolant discharge pipe 142 for discharging the coolant to the outside.

A valve mechanism 150 is disposed in the lower tank portion 133 of the condenser 130. The inside of the valve mechanism 150 is branched by a diaphragm 151 into a space 152 on the atmosphere side in communication with the atmosphere, and a communication flow path 153 for communicating the lower tank portion 133 with the lower tank portion 113. The communication flow path 153 is provided with a valve body 154 connected to the diaphragm 151 and adapted to open and close the communication flow path 153.

The diaphragm 151 is displaced in the left-right direction shown in FIG. 2 by a balance between the atmospheric pressure applied from the outside air and the internal pressure of the condenser 130 (heat pipe 101). The displacement of the diaphragm 151 displaces the valve body 154 to open and close the communication flow path 153. In this way, the valve mechanism 150 serves as a valve for opening and closing the communication flow path 153 according to the pressure of the working medium. More specifically, when the internal pressure of the condenser 130 (heat pipe 101) increases to above a predetermined internal pressure (valve closing pressure) to overcome the atmospheric pressure, the valve body 154 slides in the right direction shown in FIG. 2 to close the communication flow path 153. Conversely, when the internal pressure of the condenser 130 (heat pipe 101) decreases to below the predetermined pressure (valve closing pressure), the valve body 154 is opened.

The condenser 130 is disposed outside the duct 120 and on the side of the evaporator 110, and is connected to the evaporator 110 so as to communicate the upper tank portion 114 with the upper tank portion 132. Also, the condenser 130 is connected so as to communicate the communication flow path 153 of the valve mechanism 150 with the lower tank portion 113. The lower tank portion 113, the tube 111, the upper tank portion 114, the upper tank portion 132, the tube 131, the lower tank portion 133, the valve mechanism 150 (communication flow path 153), and the lower tank portion 113 are joined in an annular shape so as to form the heat pipe 101.

As mentioned above, the exhaust heat recovery device 100 is formed. The exhaust heat recovery device 100 is disposed in a recessed portion formed to be recessed toward the inside of the vehicle compartment as viewed from the ground under a floor of the vehicle. The duct 120 (the catalyst 12, and the evaporator 110) intervenes in the exhaust pipe 11, and both pipes 141 and 142 of the water tank 140 are connected to the exhaust heat recovery circuit 30 (see FIG. 1).

Now, the operation, effect and advantage of the exhaust heat recovery device 100 with the above-described arrangement will be described below.

When the engine 10 is actuated, the water pump 22 is operated, allowing the coolant to circulate through the radiator circuit 20, the exhaust heat recovery circuit 30, and the heater circuit 40. The exhaust gas of fuel burned by the engine 10 flows through the exhaust pipe 11, and then is cleaned by the catalyst 12 of the exhaust heat recovery device 100. At this time, the temperature of the exhaust gas is increased through the effect of cleaning by the catalyst 12. The exhaust gas having passed through the catalyst 12 flows into the evaporator 110 on the downstream side without being affected so much by the flow in the duct 120, and then is discharged into the atmosphere. The coolant circulating through the exhaust heat recovery circuit 30 passes through the inside of the water tank 140 (condenser 130) of the exhaust heat recovery device 100.

After the engine 10 is actuated, the internal pressure of the heat pipe 101 is gradually increased with increased temperature of the coolant. Since the amount of exhaust gas changes according to a load state of the engine 10, the vehicle with the normal engine has its internal pressure changed according to various operational states of the vehicle, including acceleration, deceleration, and stopping.

While the internal pressure of the heat pipe 101 continues being increased on a state below the valve closing pressure, the valve mechanism 150 is in a valve opened state. Water (working medium) in the heat pipe 101 receives heat from the exhaust gas flowing through the duct 120 at the evaporator 110 to begin to be boiled and vaporized so as to generate steam. The steam ascends in the tubes 111 to flow into the condenser 130 (the upper tank portion 132 and the tubes 131) via the upper tank portion 114. The steam flowing into the condenser 130 is cooled by the coolant flowing from the exhaust heat recovery circuit 30 into the water tank 140 to become condensed water, and the condensed water passes through the lower tank portion 133 and the communication passage 153 of the valve mechanism 150 to be refluxed and returned to the lower tank portion 113 of the evaporator 110.

Thus, the heat of the exhaust gas is transferred to the water, and then transported from the evaporator 110 to the condenser 130. When the steam is condensed by the condenser 130, the heat is discharged as the condensed latent heat, and the coolant flowing through the exhaust heat recovery circuit 30 is positively heated. Therefore, warning of the engine 10 is promoted, to achieve reduction in friction loss of the engine 10, and in an increase of amount of the fuel for improvement of the low-temperature startup characteristics, thereby improving the fuel efficiency. Thus, it is also possible to improve the heating property of the heater core 41, using the coolant as a heating source. Some part of heat of the exhaust gas is transferred from the evaporator 110 to the condenser 130 via the outer wall surface of the heat pipe 101.

Provision of the tubes 111 and the fins 112 in the evaporator 110 increases the area for receiving the heat from the exhaust gas. Therefore, it can promote the evaporation of the working medium at the evaporator 110, and thus can increase the amount of heat transport into the condenser 130.

Then, after the temperature of coolant exceeds a predetermined temperature (for example, 70° C.) to cause the internal pressure to exceed the valve closing pressure, the valve mechanism 150 is brought into a valve closed state, thereby preventing the reflux of the condensed water in the heat pipe 101. In the evaporator 110, the water therein is completely evaporated (dried out), and flows into the condenser 130. In the condenser 130, the condensed water is stored.

Then, the heat transport by the evaporation and condensation of water is surely stopped (the recovery of exhaust heat is stopped), so that the amount of heat transferred to the coolant side is caused only by the heat transfer via the heat pipe 101. Thus, when the exhaust heat recovery is continued while the temperature of exhaust gas is increased with increasing load on the engine 10, the temperature of coolant is excessively increased to exceed the heat radiation capacity of the radiator 21, thereby leading to overheat. However, switching to the stopping of the exhaust heat recovery can prevent this problem.

In this embodiment, the catalyst 12 and the evaporator 110 are disposed together in the duct 120, thereby providing the compact exhaust heat recovery device 100. Thus, the catalyst 12 and the evaporator 110 can be effectively mounted collectively under the floor of the vehicle (on the other side), as compared to the conventional case where mounting positions for the catalyst 12 and the evaporator 110 are respectively determined and handled.

The catalyst 12 is disposed on the upstream side of the exhaust gas flow with respect to the evaporator 110, and thus can exhibit a sufficient cleaning function of the exhaust gas without being affected by the exhaust gas cooled at the evaporator 110.

The evaporator 110 exchanges heat with the exhaust gas which is cleaned by the catalyst and whose temperature is increased, thereby enabling the effective recovery of the exhaust heat.

The duct 120 for accommodating the catalyst 12 and the evaporator 110 is formed continuously without reducing the sectional area of the duct 120. This can decrease the number of enlarged pipe portions and reduced pipe portions formed in the exhaust pipe 11, thereby reducing a loss in pressure of the exhaust gas through the circulation.

The transport of the heat of the exhaust gas toward the coolant side by the exhaust heat recovery device 100 as mentioned above leads to the fact that the exhaust gas is cooled, and moisture contained in the exhaust gas is stored in the lower surface 121 of the duct 120 as the condensed water. Normally, the condensed water stored may fly out to the catalyst 12 and the evaporator 110 by turbulent flow of the exhaust gas, generated due to a loss in pressure at the evaporator 110.

In this embodiment, however, the groove 122 is provided on the lower surface 121 of the duct 120 for accommodating therein the evaporator 110, so that the condensed water stored in the lower surface 121 is collected in the groove 122. The condensed water collected can flow to the rear side of the exhaust pipe 11 together with the flow of the exhaust gas, thereby reducing influences of wetting on the catalyst 12 and the evaporator 110. The influence on the catalyst 12 due to wetting includes occurrence of a fracture in the catalyst 12 made of a normal ceramic material by a quenching effect. The influence on the evaporator 110 includes occurrence of corrosion due to the wetting.

A plurality of groove 122 may be provided in the lower surface 121. This can more effectively collect the condensed water to allow it to flow to the rear end side.

The groove 122 may be inclined downward toward the rear end side of the exhaust pipe 11. In this case, the condensed water can more effectively flow to the rear end side.

The lower surface 121 may be preferably inclined downward toward the groove 122 in the width direction (in the left-right direction shown in FIG. 2) of the groove 122 on the lower surface 121. In this case, the condensed water can be more effectively collected in the groove 122.

Further, in a case where the level of noise, generated when part of the exhaust gas is discharged to the outside without passing through a muffler on the rear end side of the exhaust pipe 11, is not problematic, a discharge hole may be provided in the groove 122 to be opened downward toward the outside, thereby allowing the condensed water stored in the groove 122 to be discharged from the discharge hole toward the outside.

Second Embodiment

Figure 3:
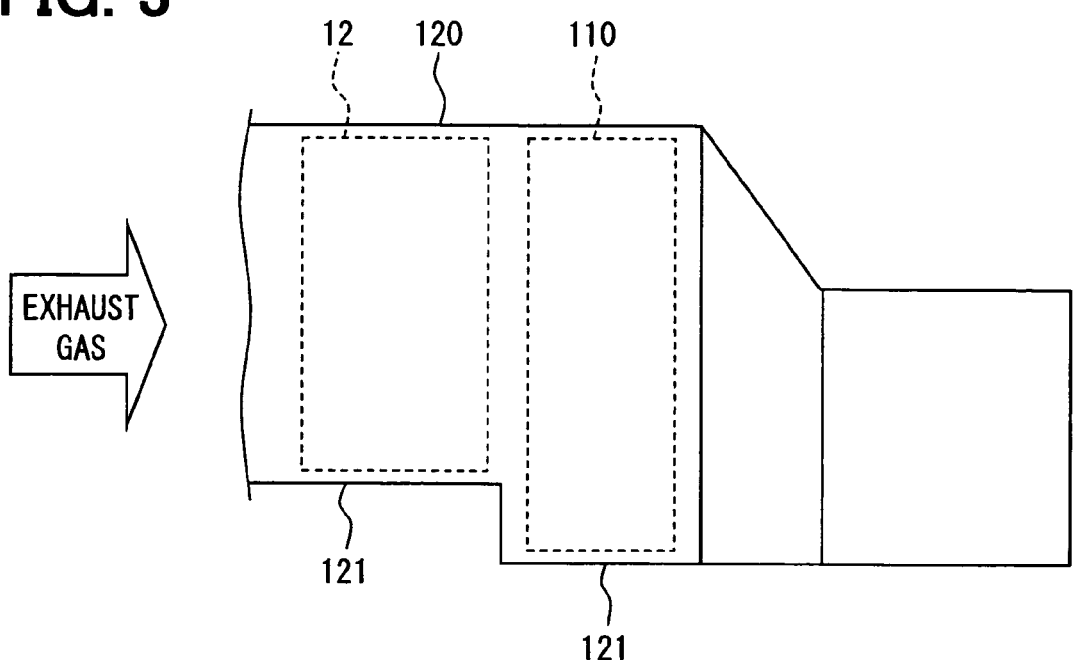
FIG. 3 is a side view showing a shape of a duct according to a second embodiment.

FIG. 3 shows a second embodiment of the present invention. The second embodiment differs from the first embodiment in shape of the lower surface 121 of the duct 120.

The lower surface 121 of the duct 120 is formed such that an area of the lower surface 121 with the catalyst 12 on the upstream side of the exhaust gas flow from the evaporator 110 is located at a higher position in the vertical direction than an area of the lower surface 121 with the evaporator 110.

That is, the lower surface 121 of the duct 120 is a part extending over the catalyst 12 from the upstream side of the exhaust gas flow to expand toward the lower side with a stepped portion, and further extending toward the downstream side of the exhaust gas flow with the same plane height on the lower surface 121.

Thus, even when the temperature of the exhaust gas is decreased by the evaporator 110 and the moisture contained in the exhaust gas becomes condensed water, the condensed water can be prevented from flowing toward the catalyst 12, and can flow toward the rear end side of the exhaust pipe 11 together with the flow of the exhaust gas. Accordingly, it can reduce the influences on the catalyst 12 and evaporator 110 due to the wetting, like the first embodiment.

Third Embodiment

A third embodiment has a basic shape similar to that of the first embodiment. The third embodiment differs from the first embodiment in material of the fin 112 included in the heat exchanging portion of the evaporator 110. The fin 112 of this embodiment is made of material to which a noble metal catalyst, such as platinum (Pt), is added.

The heat exchanging portion of the evaporator 110 itself has the cleaning function of the exhaust gas. That is, in high output or the like of the engine, the internal pressure of the heat pipe 101 exceeds the valve closing pressure, so that the communication flow path 153 is closed by the valve mechanism 150 to stop the heat transport by the exhaust heat recovery device 100. In this case, the exhaust heat recovery device 100 does not work the cooling effect of the exhaust gas, while the fins 112 effectively exhibit the cleaning effect, so as to make the inherent catalyst converter 12 compact. Alternatively, when the cleaning capacity of the catalyst converter 12 is maintained, the cleaning capacity of the fins 112 can be improved. The fins 112 are basically used to enlarge the areas of heat exchange. As the surface area of the fin 112 becomes larger, the cleaning effect of the exhaust gas can be enhanced. Thus, the fin 112 is suitable for use as a member of interest to have the cleaning effect.

It is noted that the member to which the noble metal catalyst is added may be the tube 111 included in the heat exchanging portion of the evaporator 110. Furthermore, both the tubes 111 and the fins 112 may serve as the member to which the noble metal catalyst is added.

Fourth Embodiment

A fourth embodiment of the present invention will be described below based on FIGS. 4 and 5. An exhaust heat recovery device of the fourth embodiment can recover exhaust heat of the exhaust gas from an exhaust system of the engine (internal combustion engine) of the vehicle, for example, and can use the exhaust heat for promotion of engine warning or the like.

Figure 4:
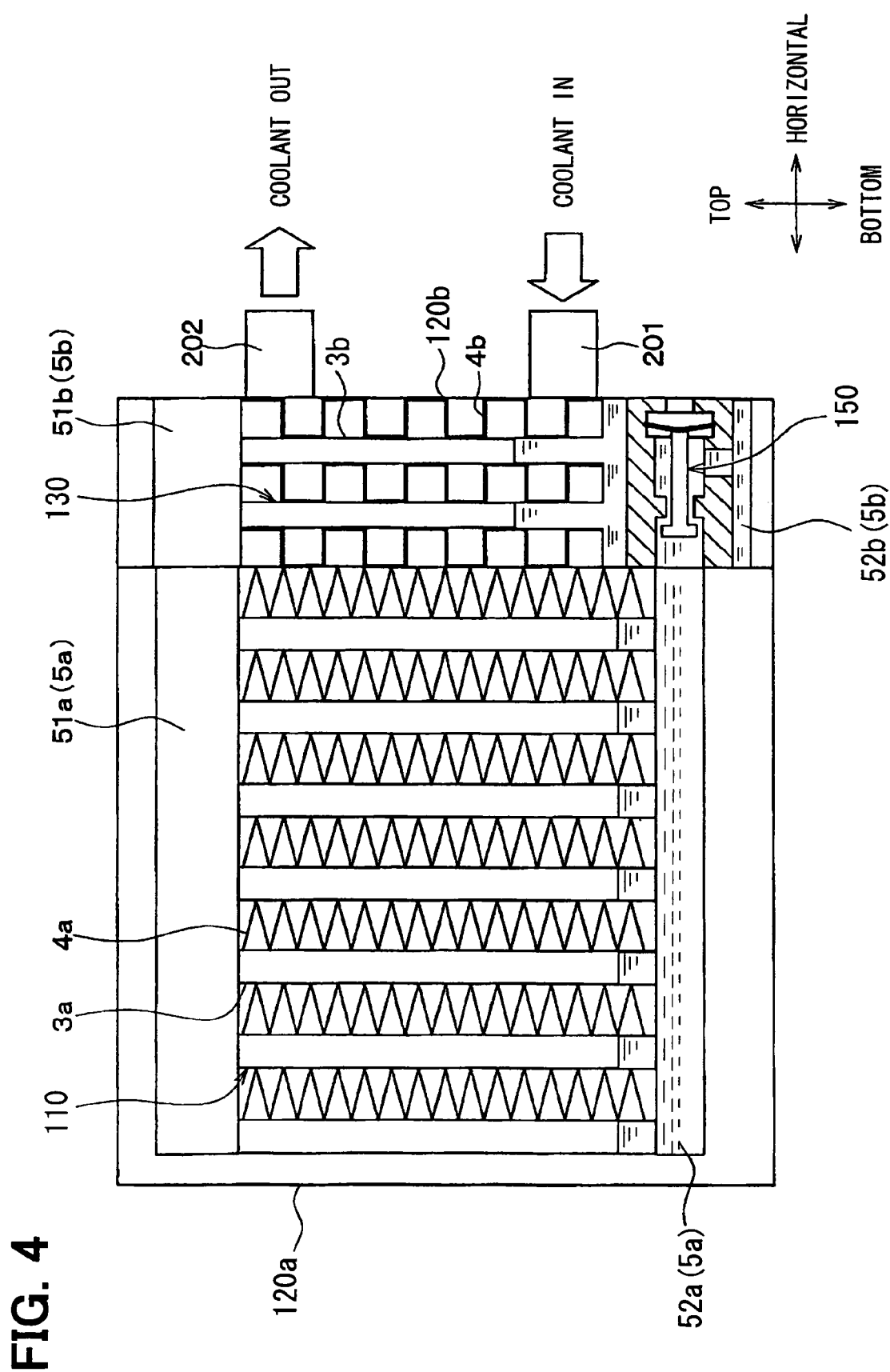
FIG. 4 is a sectional view of an exhaust heat recovery device according to a fourth embodiment.

FIG. 4 is a sectional view showing an exhaust heat recovery device according to the fourth embodiment. As shown in FIG. 4, the exhaust heat recovery device of the fourth embodiment includes the evaporator 110 and the condenser 130. The evaporator 110 and the condenser 130 are arranged adjacent to each other in the horizontal direction.

The evaporator 110 is disposed in a first casing 120a (accommodating portion) disposed in an exhaust cylinder (not shown) of the engine. The evaporator 110 exchanges heat between the exhaust gas and the working fluid to be described later, allowing the working fluid to evaporate.

The condenser 130 is provided outside of the exhaust cylinder, and is disposed in a second casing 120b (accommodating portion) arranged in a coolant path (not shown) of the engine. The condenser 130 exchanges heat between the working fluid evaporated by the evaporator 110 and the engine coolant to allow the working fluid to be condensed therein. The second casing 120b is provided with a coolant inlet 201 connected to an outlet side for the coolant of the engine, and a coolant outlet 202 connected to an inlet side for the coolant of the engine.

Now, the structure of the evaporator 110 will be described below.

The evaporator 110 has a plurality of heat pipes 3a on the evaporation side, and corrugated fins 4a connected to the outer surfaces of the heat pipes 3a on the evaporation side. The heat pipes 3a on the evaporation side are formed in flat shapes such that the circulation direction (direction perpendicular to the paper surface) of the exhaust gas is identical to the major diameter direction. The heat pipes 3a on the evaporation side are arranged in parallel such that the longitudinal direction of the heat pipe 3a is identical to the vertical direction.

Headers 5a on the evaporation side are respectively provided at both side ends of the heat pipes 3a in the evaporator 110 in the longitudinal direction of the heat pipes 3a on the evaporation side, to extend in the direction of lamination of the heat pipes 3a on the evaporation side in communication with all the heat pipes 3a on the evaporation side. The evaporation side header 5a located on the upper end side of the exhaust heat recovery device among the headers 5a is referred to as a first header 51a on the evaporation side. The evaporation side header 5a located on the lower end side of the exhaust heat recovery device is referred to as a second header 52a on the evaporation side.

Now, the structure of the condenser 130 will be described below.

The condenser 130 has a plurality of heat pipes 3b on the condensation side, and straight fins 4b connected to the outer surfaces of the heat pipes 3b on the condensation side. The heat pipes 3b on the condensation side are formed in flat shapes such that the circulation direction (direction perpendicular to the paper surface) of the exhaust gas is identical to the major diameter direction. The heat pipes 3b are arranged in parallel such that the longitudinal direction of the heat pipe 3b is identical to the vertical direction.

Headers 5b on the condensation, side are respectively provided in the condenser 130 at both ends in the longitudinal direction of the heat pipes 3b on the condensation side, to extend in the direction of lamination of the condensation side heat pipes 3b in communication with all heat pipes 3b on the condensation side. The condensation side header 5b located on the upper end side in the vertical direction of the exhaust heat recovery device among the headers 5b is referred to as a first header 51b on the condensation side. The condensation side header 5b located on the lower end side of the exhaust heat recovery device in the vertical direction is referred to as a second header 52b on the condensation side.

The header 5a on the evaporation side and the header 5b on the condensation side are connected to each other to communicate with each other. The heat pipes 3a and 3b on the evaporation and condensation sides and the headers 5a and 5b on the evaporation and condensation sides form a closed loop, into which the working fluid capable of being evaporated and condensed, such as water or alcohol, is charged.

A valve mechanism 150 is disposed in the second header 52b on the condensation side. The valve mechanism 150 serves as diaphragm type opening and closing means for forming a flow path connecting the heat pipe 3b on the condensation side with the second header 52a on the evaporation side, and for opening and closing the flow path according to the internal pressure of the heat pipe 3a on the evaporation side (i.e., the pressure of the working fluid). Specifically, the valve mechanism 150 is closed when the internal pressure is increased at a predetermined temperature of the coolant from a normal valve opening state to exceed a first predetermined pressure. Conversely, the valve mechanism 150 is also opened again when the internal pressure is decreased to be below a second predetermined pressure which is lower than the first predetermined pressure. This can stop recovering the exhaust heat so as to avoid the overheat at the high load time of the engine, such as in summer.

The detailed structure of the heat pipe 3b on the condensation side according to the fourth embodiment will be described below. In this embodiment, the heat pipes 3b on the condensation side have the same structure.

Figure 5:
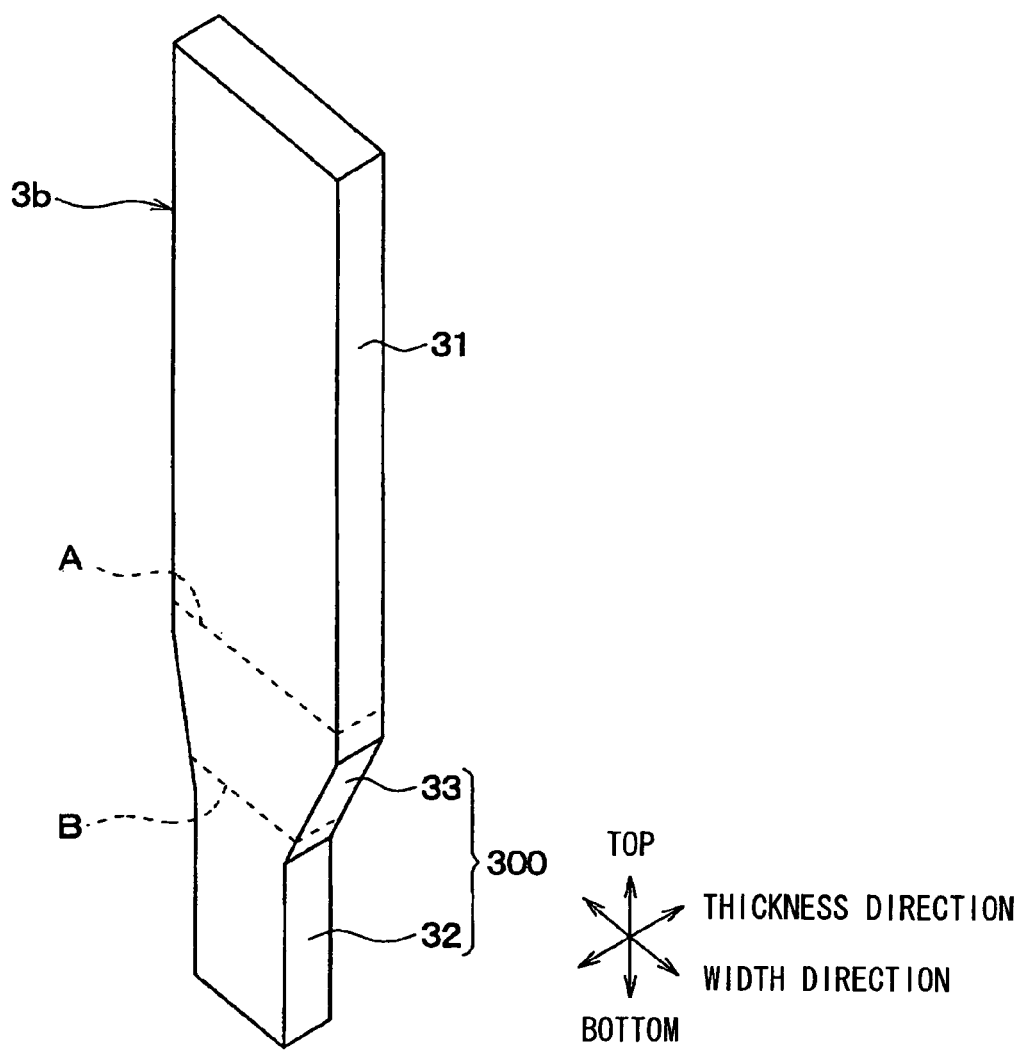
FIG. 5 is an enlarged perspective view showing a part of a heat pipe on a condensation side according to the fourth embodiment.

FIG. 5 is a perspective view showing the heat pipe 3b on the condensation side according to the fourth embodiment. As shown in FIG. 5, the heat pipe 3b on the condensation side of the fourth embodiment includes an upper portion 31 disposed on the upper side (on the first condensation-side header 51b side), a lower portion 32 disposed on the lower side (on the second condensation-side header 52b side), and an intermediate portion 33 disposed between the upper portion 31 and the lower portion 32.

The sectional area of the lower portion 32 in the heat pipe 3b on the condensation side (the sectional area perpendicular to the longitudinal direction of the heat pipe 3b on the condensation side) is smaller than that of the upper portion 31. The intermediate portion 33 is connected to the upper portion 31 and the lower portion 32 such that its sectional area is gradually decreased from the lower end of the upper portion 31 to the upper end of the lower portion 32. Thus, the intermediate portion 33 has the small sectional area over the entire area, as compared with that of the upper portion 31. In this embodiment, the lower portion 32 and the intermediate portion 33 form a small sectional area portion 300. Only the length in the width direction of the heat pipe 3b on the condensation side is changed to change the sectional area thereof.

When the evaporator 110 is heated, that is, when the working fluid circulates through, the small sectional area portion 300 is positioned below the upper surface of the working fluid in the heat pipe 3b on the condensation side (hereinafter referred to as a water surface in circulation, see the broken line A in FIG. 5). The water surface position in circulation is different depending on the size or operational condition of the exhaust heat recovery device. For example, when the evaporator 110 is heated, the water surface position can be set to any position where the upper surface of the working fluid in the heat pipe 3b on the condensation side can be positioned.

In this embodiment, the lower portion 32 whose sectional area is smaller than that of the intermediate portion 33 is positioned below the upper surface of the working fluid (hereinafter referred to as a water surface in stopping, see the broken line B in FIG. 5) in the heat pipes 3b on the condensation side when the evaporator 110 is not heated, that is, when the circulation of the working fluid is stopped. The position of the water surface in stopping is determined by the amount of the working fluid charged when the exhaust heat recovery device is manufactured.

When the circulation of the working fluid is started by heating the evaporator 110 from a state in which the circulation of the working fluid is stopped (in which the evaporator 110 is not heated), the upper surface (water surface) position of the working fluid in the heat pipe 3b on the condensation side is enhanced. At this time, in this embodiment, the small sectional area portion 300, which has the smaller sectional area than that of the upper portion 31, is positioned below the water surface in circulation in the heat pipe 3b on the condensation side. This can further enhance the upper surface (water surface) position of the working fluid in the heat pipe 3b on the condensation side in the circulation of the working fluid, resulting in an increased difference in water head height between the evaporator 110 and the condenser 130

In the heat pipe 3b on the condensation side, the small sectional area portion 300 is disposed below the water surface in circulation, and thus the sectional area of a part positioned above the water surface in circulation does not need to be decreased. This can enlarge the area of the outer surface of the upper part of the heat pipe 3b on the condensation side, thereby improving the heat radiation property.

Accordingly, it is possible to ensure the difference in water head height between the evaporator 110 and the condenser 130 in circulation of the working fluid, while ensuring the heat radiation property of the upper part of the heat pipe 3b on the condensation side.

In the fourth embodiment, a valve mechanism 150 is disposed in the second header 52b on the condensation side to control the working fluid flow from the condenser 130 to the evaporator 110. In this case, when the valve mechanism 150 is closed to stop the return of the working fluid, the working fluid is stored in the condenser 130. Thus, a capacity for storing the condensed working fluid is needed on the upstream side of the valve mechanism 150 in the condenser 130. As mentioned above, positioning of the small sectional area portion 300 below the water surface in circulation in the heat pipe 3b on the condensation side can enlarge the flow path sectional area of the upper part of the heat pipe 3b on the condensation side above the water surface in the circulation. This can ensure the capacity for storing the condensed working fluid in the upper portion 31 of the heat pipe 3b on the condensation side.

Fifth Embodiment

Figure 6:
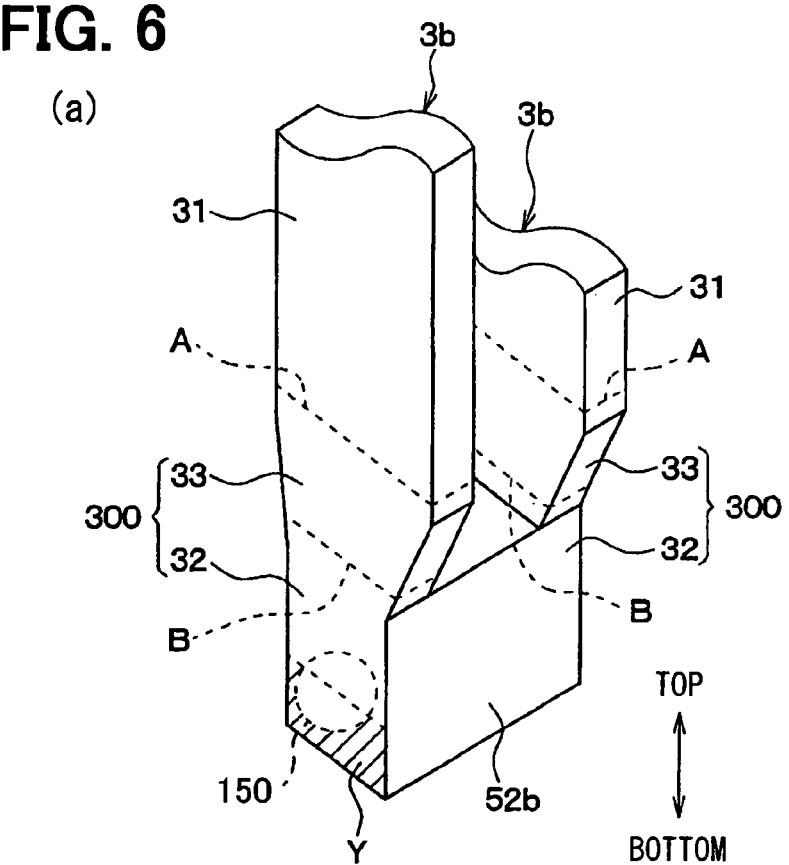
Figure 6:
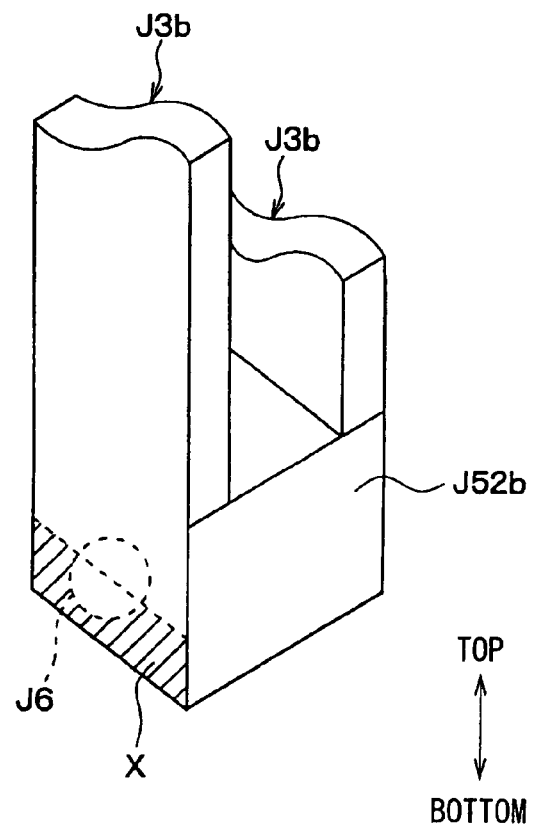

A fifth embodiment of the present invention will be described below based on FIG. 6. The same elements as those in the above-described fourth embodiment are designated by the same reference numerals, and thus the description thereof will be omitted below.

FIGS. 6(a) and 6(b) are enlarged perspective views showing the main parts of the heat pipe 3b on the condensation side, in which FIG. 6(a) shows a structure of the fifth embodiment, and FIG. 6(b) shows a structure of a comparison example.

As shown in FIG. 6(a), the condenser 130 of this embodiment is of a so-called drawn cup type. The condenser 130 is made by aligning the centers of two tube plates, by laminating these tube plates, and by brazing these tube plates to each other, so as to form the laminated flat heat pipes 3b on the condensation side and the condensation side headers 5b on both ends in the longitudinal direction of the heat pipes 3b on the condensation side. In this embodiment, the lower portion 32 of the heat pipe 3b on the condensation side corresponds to the second header 52b on the condensation side. A valve mechanism 150 having a substantially cylindrical shape is provided in the second header 52b on the condensation side to control the working fluid flow from the condenser 180 to the evaporator 110.

Conventionally, as shown in FIG. 6(b), a part located below a valve mechanism J6 in a second head J52b on the condensation side (see a part X indicated by the diagonal line in FIG. 6(b)) is a dead space which never contributes to the securing of the difference in water head height between the evaporator 110 and the condenser 130.

In contrast, in the fifth embodiment, the lower portion 32 is formed in the heat pipe 3b on the condensation side, that is, the sectional area of the second header 52b on the condensation side is made smaller than that of the upper portion 31. Thus, it is possible to decrease the capacity of the dead space (see a part Y indicated by the diagonal line in FIG. 6(a)). This can increase the difference in water head height between the evaporator 110 and the condenser 130, thereby increasing the flow rate of the working fluid entering the evaporator 110 from the condenser 130. Thus, the amount of working fluid circulating between the evaporator 110 and the condenser 130 can be increased, thereby improving the heat recovery property.

Sixth Embodiment

A sixth embodiment of the present invention will be described below based on FIG. 7. The same elements as those in the above-described fourth embodiment are designated by the same reference numerals, and thus the description thereof will be omitted below.

Figure 7:
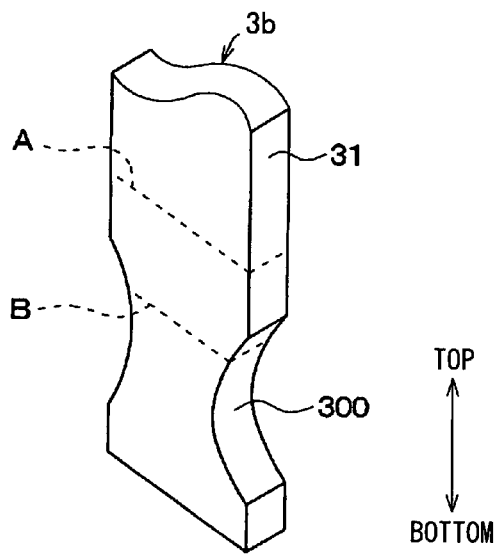
FIG. 7 is an enlarged perspective view showing a part of a heat pipe on a condensation side according to a sixth embodiment.
Figure 8:
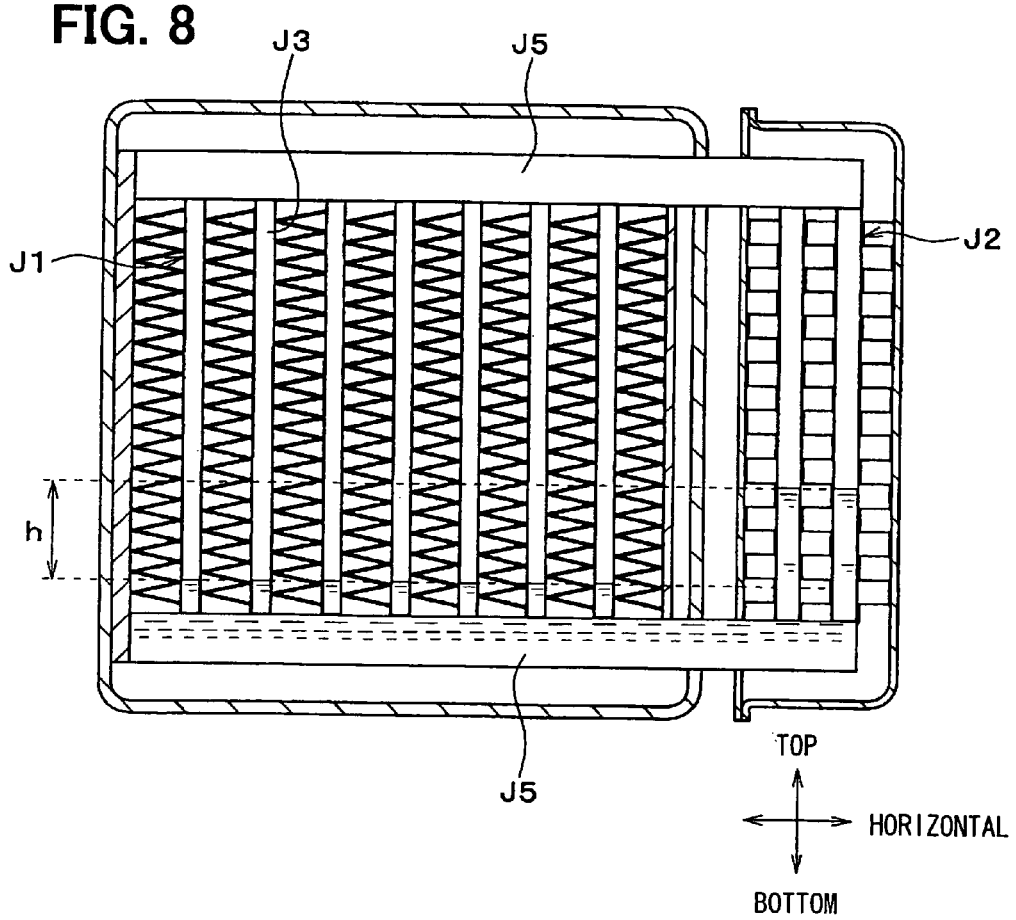
FIG. 8 is a sectional view showing a conventional exhaust heat recovery device.

FIG. 7 is an enlarged perspective view showing a main portion of the heat pipe 3b on the condensation side according to the sixth embodiment. As shown in FIG. 7, a small sectional area portion 300 of this embodiment has a working fluid flow path gradually decreased from the upper side to the lower side and thereafter gradually increased. This can obtain the same effects as those of the fourth embodiment as described above.

Other Embodiments

Although in the above-described fourth to sixth embodiments, only the length in the width direction of the heat pipe 3b on the condensation side is changed to change the sectional area thereof, the invention is not limited thereto. For example, by changing the length in the thickness direction of the heat pipe 3b on the condensation side, the sectional area of the heat pipe 3b may be changed.

Although in the above-described fourth to sixth embodiments, all heat pipes 3b on the condensation side are provided with the small sectional areas 300, the invention is not limited thereto. At least one heat pipe 3b on the condensation side may be provided with the small sectional area 300. Although in each of the above-described embodiments, the valve mechanism 150 is provided in the second header 52b on the condensation side, the valve mechanism 150 may not be provided.

Although in the above-described first to third embodiments the duct 120 is a tube having a rectangular section, the invention is not limited thereto. When the catalyst 12 is formed in a cylindrical shape, the section of an area of the duct 120 corresponding to the catalyst 12 may be formed in such a circular shape to touch internally the catalyst 12 in a rectangular manner, and connected smoothly to a rectangular sectional portion of the duct 120 corresponding to the evaporator 110.

Although in the above-described first to third embodiments, the basic structure of the exhaust heat recovery device 100 includes the condenser 130 disposed on a side end of the evaporator 110, the invention is not limited thereto. The condenser 130 may be disposed above the evaporator 110. In this case, the tubes 131 of the condenser 130 may be disposed horizontally.

The valve mechanism 150 is adapted to be opened and closed according to the internal pressure of the heat pipe 101, that is, the pressure of the working medium. Instead of this, the valve mechanism 150 may be a valve that is opened and closed according to the temperature of the coolant or working medium.

When the radiator 21 has an adequate margin in heat radiation capacity, the valve mechanism 150 may be withdrawn, and thus the lower tank portion 133 and the lower tank portion 113 may be directly connected to each other.

The invention claimed is:

1. An exhaust heat recovery device for a vehicle having an internal combustion engine used as a driving source for vehicle running, the exhaust heat recovery device comprising:
   an evaporator disposed in an exhaust gas path through which exhaust gas discharged from the internal combustion engine is circulated, the evaporator being adapted to evaporate a working fluid by heat exchange between the exhaust gas and the working fluid flowing therein; and
   a condenser disposed in a coolant path through which a coolant of the internal combustion engine is circulated, the condenser being adapted to exchange heat between the coolant and the working fluid evaporated by the evaporator, thereby condensing the working fluid,
   wherein the evaporator and the condenser are disposed in a closed loop flow path through which the working fluid is circulated,
   wherein the evaporator and the condenser are disposed adjacent to each other in a substantially horizontal direction,
   wherein the condenser has a plurality of heat pipes on a condensation side, disposed in parallel to each other,
   wherein the heat pipe on the condensation side has a small sectional area portion that has a smaller sectional area than that of an upper end portion of the heat pipe, and
   wherein the small sectional area portion is positioned below an upper surface of the working fluid in the heat pipe on the condensation side when the evaporator is heated.

2. The heat exhaust recovery device according to claim 1, further comprising a valve mechanism disposed at a downstream side in the condenser, for opening and closing a flow path through which the working fluid condensed flows into the evaporator.

3. The heat exhaust recovery device according to claim 1, wherein the small sectional area portion is positioned at least below the upper surface of the working fluid in the heat pipe on the condensation side when the evaporator is not heated.

* * * * *